Sept. 1, 1931.   A. G. ENOCK   1,821,883
APPARATUS FOR TRANSFERRING BOTTLES OR CONTAINERS FROM ONE LEVEL TO ANOTHER
Filed Oct. 20, 1930   3 Sheets-Sheet 2

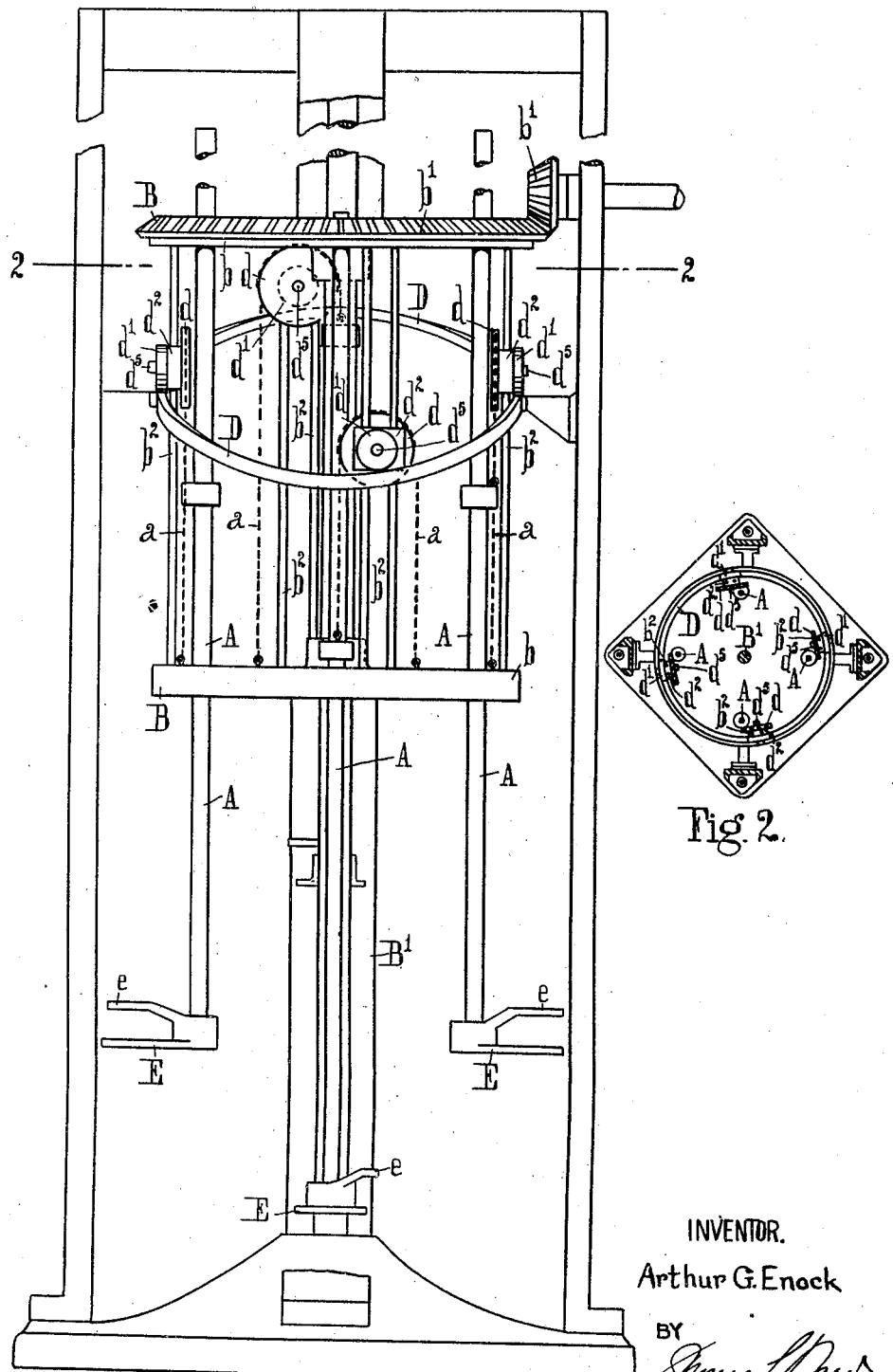

INVENTOR.
Arthur Guy Enock
BY
ATTORNEY

Sept. 1, 1931. A. G. ENOCK 1,821,883
APPARATUS FOR TRANSFERRING BOTTLES OR CONTAINERS FROM ONE LEVEL TO ANOTHER
Filed Oct. 20, 1930 3 Sheets-Sheet 3

INVENTOR
Arthur Guy Enock
BY
ATTORNEY

Patented Sept. 1, 1931

1,821,883

UNITED STATES PATENT OFFICE

ARTHUR GUY ENOCK, OF WEMBLEY PARK, ENGLAND

APPARATUS FOR TRANSFERRING BOTTLES OR CONTAINERS FROM ONE LEVEL TO ANOTHER

Application filed October 20, 1930, Serial No. 490,058, and in Great Britain October 5, 1929.

This invention relates to transferring bottles or containers from one conveyor to another at different levels more particularly in apparatus such as described in the specifications of my previous U. S. Patents Nos. 1,649,393 and 1,741,925 for pasteurizing milk in bottles in which the bottles are traversed through chambers of different temperatures placed in tiers one above the other. The invention may however be applied to other purposes for example for conveying trays or containers of material from one level to another.

The apparatus comprises a number of vertically moving rods or pedestals mounted in rotary frames to revolve round a central axis, each fitted with a table or platform to receive a bottle or container and raised and lowered by a ramp or cam surface.

The invention will be fully described with reference to the accompanying drawings:—

Fig. 1 is a diagrammatic elevation showing one form of the transfer apparatus.

Fig. 2 is a sectional plan on line 2—2 Fig. 1.

Figure 3:
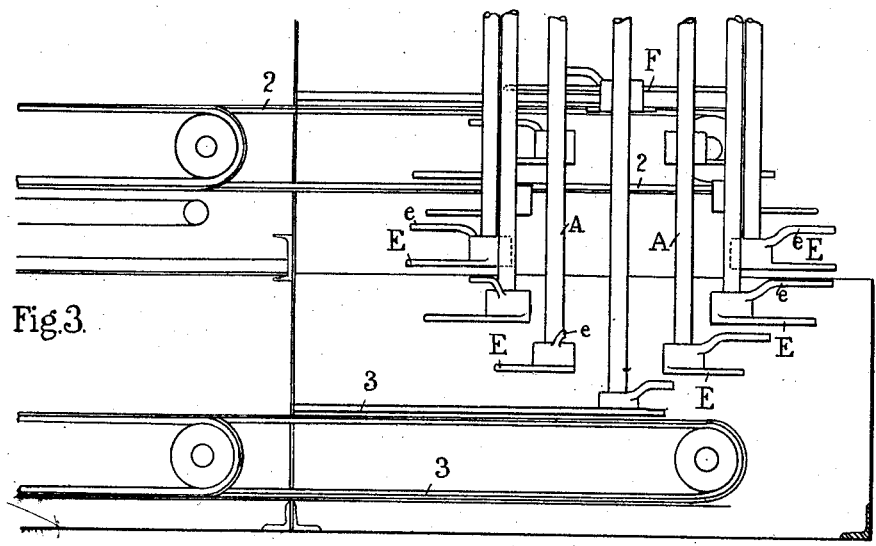
Fig. 3 is an elevation of the lifting pedestals and tables.
Figure 4:
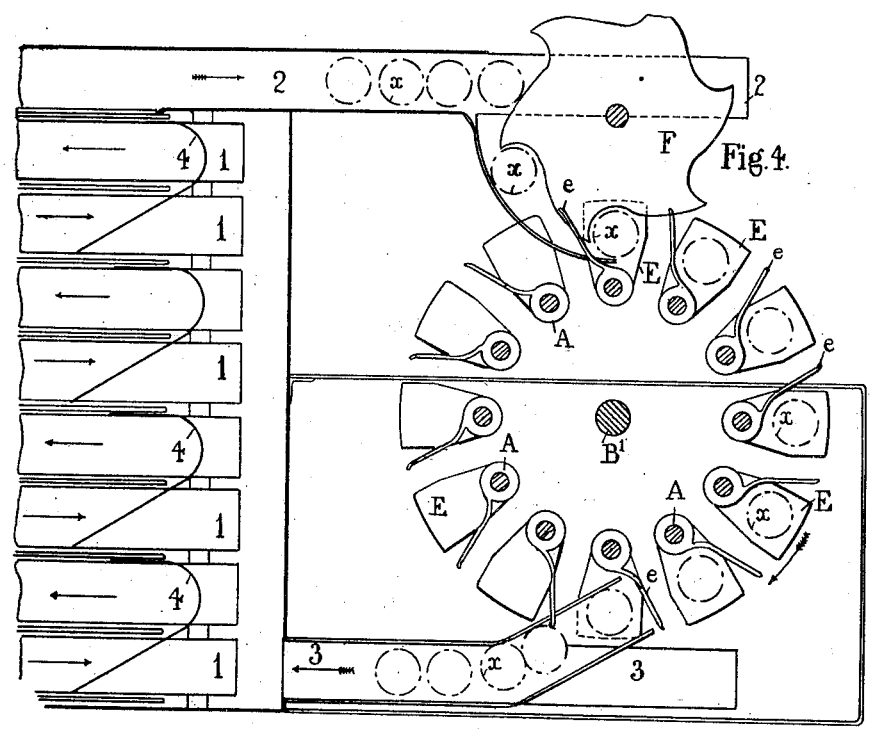
Fig. 4 is a plan part in section of the pedestals and tables.

The apparatus is constructed with a number of vertically moving rods or pedestals A mounted in a rotary frame B to revolve around a centre in either a circular, elliptical or other path and an inclined ramp or cam surface D from which the rods or pedestals A are suspended and by which they are raised and lowered as they are carried round with the rotary frame B. Each pedestal or rod A is fitted with a platform or table E to receive a bottle or container $x$ which is maintained horizontal during the vertical movements of the pedestals to enable bottles or vessels filled with milk or other liquid to be carried thereon without spilling. The rotary frame B comprises upper and lower annular members $b$ and vertical guide bars $b^2$ between said members. The annular members $b$ are fixed against vertical movement and form guides through which the pedestals or rods A slide. The ramp or cam surface D may give a continuous up and down movement to the pedestals or rods or it may be of a shape to give a rest or dwell at the top or bottom of the lift or both. A star wheel F, mounted on a rotary shaft or spindle, maybe disposed adjacent to the revolving pedestals A at either the top or bottom level to transfer the bottles $x$ on to the tables or platforms E.

In Figs. 1 to 4 the lifting and lowering apparatus is shown in conjunction with traversing conveyors 1 by which the bottles may be moved in zig zag fashion through one of the pasteurizing chambers described in the U. S. specifications Nos. 1,649,393 and 1,741,925, the bottles being delivered by the conveyors 1 to a conveyor 2 from which they are taken by the star wheel F and successively delivered to tables or platforms E carried by the pedestals A and are lowered by said pedestals to the level of another chamber. Corner guides 4 above the conveyors 1 direct the bottles from one conveyor 1 on to the next as they are moved through the chamber. The rods or pedestals A are suspended by chains or cables $a$ from sprockets or pulleys $d$, one end of each chain or cable being attached to the pedestal and the other end to the member $b$ of the frame B. The sprockets or pulleys $d$ are mounted on spindles $d^5$ journalled in vertically sliding blocks $d^2$ adapted to slide vertically on the guide bars $b^2$. A roller $d^1$ mounted on each spindle $d^5$ rolls round the inclined ramp or cam surface D. The frame B is secured to a central shaft which is revolved by the gears $b^1$, and the rollers $d^1$, as they run round the ramp D, each simultaneously raises and lowers one of the sliding blocks $d^2$ and the sprockets $d$ carried by such blocks. Since each chain or cable $a$ has one of its ends connected to one of the pedestals A and its other end connected to the member $b$ of the frame B, the pedestals are caused to move downwards or upwards twice the vertical distance traversed by the sprockets $d$. As the pedestals A revolve round the centre column B¹ the bottles x are transferred in succession from the conveyor 2 by the star wheel F on to the tables or platforms E and are lowered to the level of the conveyor 3 and are removed from the tables or platform E by the guides e carried by the pedestals A and placed onto the conveyor 3 by which they are carried into the next chamber. As the pedestals A continue their rotation the platforms E are successively raised again to the correct level to receive further bottles from the conveyor 2.

Figure 5:
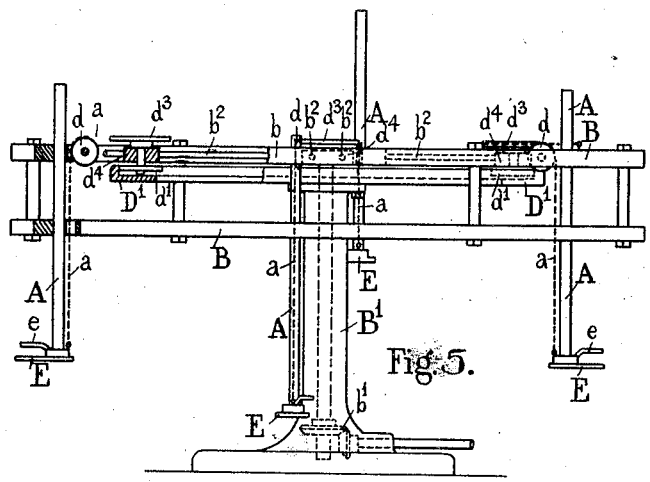
Figs. 5 and 6 are an elevation and plan respectively of another form of the invention.
Figure 6:
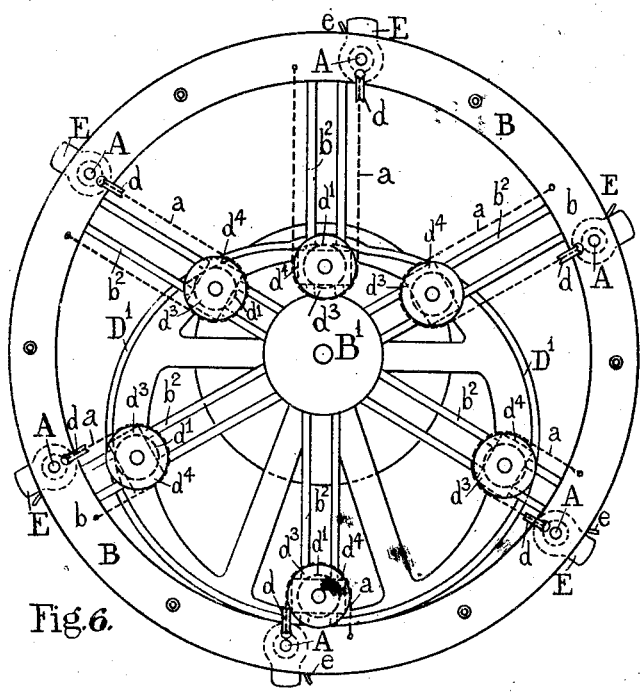

In the construction shown in Figs. 5 and 6 the pedestals or rods A are vertically movable in the rotary frame B rotated by a central shaft around a fixed central column B¹. The rods or pedestals A are suspended by chains or cables a which pass round sprockets or pulleys d carried by the frame B, one adjacent each of the pedestals A, and also around sprockets or pulleys d³ which are keyed to the upper ends of spindles journalled in blocks d⁴ slidable on guide bars or slideways b² which extend inwardly from the frame B toward the center of the latter. Each of the chains or cables a has its opposite end connected to the frame B.

Rollers d¹, secured to the lower ends of said spindles, bear against a horizontal cam track D¹ secured to the central column B' within the frame B, so that, as the frame B rotates around the cam track D¹, the sliding blocks d⁴ and sprockets d³ are caused by engagement of the rollers d¹ with the cam track D¹ to move toward and away from the centre of the frame B. The to and fro movement of the sliding blocks d⁴ and sprockets or pulleys d³ raise and lower the chains or cables a and with them the vertically sliding pedestals or rods A and the tables or platforms E thereon. Thus the engagement of the rollers d¹ with the cam track D¹ not only causes movement of the sprockets or pulleys d radially of the frame B but also imparts rotation to said sprockets or pulleys. The bottles are transferred to and from the tables or platforms E, as before described from conveyors at the respective levels.

What I claim as my invention and desire to protect by Letters Patent is:—

1. Apparatus for transferring containers from one level to another, comprising a frame member and a cam member, said members being relatively rotatable, a plurality of container-supporting pedestals vertically movable relatively to said frame, a plurality of shaft-supporting members each having a shaft journalled therein, a roller and a pulley keyed to each of said shafts, said rollers engaging said cam member, and a plurality of flexible members movable, respectively, over said pulleys, each of said flexible members having one of its ends secured to said frame member and its other end secured to one of said pedestals.

2. Apparatus for transferring containers from one level to another, comprising a rotary frame, a plurality of container-supporting pedestals vertically movable relatively to said frame, a fixed cam track, a plurality of rollers movable on said cam track, pulleys carried, respectively, by said rollers, and flexible members each movable over one of said pulleys and having its opposite ends connected, respectively, to one of said pedestals and to said rotary frame.

3. Apparatus for transferring containers from one level to another, comprising a rotary frame, a plurality of container-supporting pedestals disposed in a circle concentric with the axis of rotation of said frame and vertically movable in said frame, a fixed cam concentric with the axis of rotation of said frame and of which the face is oblique to said axis, a plurality of rollers movable on said cam face, pulleys carried, respectively, by said rollers, and flexible members movable, respectively, over said rollers and each having one end connected to said frame and its other end connected to and supporting one of said pedestals.

4. Apparatus for transferring containers from one lever to another, comprising a frame rotatable on a verticle axis, a plurality of container-supporting pedestals mounted in said frame in a circle concentric with the axis of rotation of and vertically movable in said frame, a plurality of pulleys rotatable on horizontal axes on said frame, one adjacent each of said pedestals, a cam track eccentric to and directed toward the axis of rotation of said frame, a plurality of guideways each extending radially of said axis toward one of said pedestals, a plurality of blocks movable, respectively, in said guideways, a roller journalled in each of said blocks and engaging said cam track, pulleys secured, respectively, to said rollers, and flexible members each movable over one of said first named pulleys and one of the last named pulleys and each having one of its ends connected to said frame and its other end connected to and supporting one of said pedestals.

In testimony whereof I have hereunto set my hand this 7th day of October, 1930.

ARTHUR GUY ENOCK.